US012793965B2

(12) United States Patent
Lee et al.

(10) Patent No.: US 12,793,965 B2
(45) Date of Patent: Nov. 10, 2026

(54) RECHARGEABLE ELECTRODE FOR RECHARGEABLE LITHIUM BATTERY AND RECHARGEABLE LITHIUM BATTERY INCLUDING THE SAME

(71) Applicant: SAMSUNG SDI CO., LTD., Yongin-si (KR)

(72) Inventors: Jinhyon Lee, Suwon-si (KR); Bokhyun Ka, Suwon-si (KR); Kyeuyoon Sheem, Suwon-si (KR); Soonho Ahn, Suwon-si (KR); Junkyu Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 656 days.

(21) Appl. No.: 18/198,505

(22) Filed: May 17, 2023

(65) Prior Publication Data

US 2023/0352651 A1 Nov. 2, 2023

Related U.S. Application Data

(63) Continuation-in-part of application No. 17/498,861, filed on Oct. 12, 2021, now Pat. No. 12,080,874, (Continued)

(30) Foreign Application Priority Data

Apr. 27, 2018 (KR) ........................ 10-2018-0049447

(51) Int. Cl.
*H01M 4/133* (2010.01)
*H01M 4/1393* (2010.01)
(Continued)

(52) U.S. Cl.
CPC ......... *H01M 4/133* (2013.01); *H01M 4/1393* (2013.01); *H01M 4/58* (2013.01); *H01M 10/0525* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 8,801,960 | B2 | 8/2014 | Ueda et al. |
| 10,320,030 | B2 | 6/2019 | Takiguchi et al. |

(Continued)

FOREIGN PATENT DOCUMENTS

| | | |
|---|---|---|
| CN | 101341091 A | 1/2009 |
| CN | 101662014 A | 3/2010 |

(Continued)

OTHER PUBLICATIONS

T. Schott, J. L. Gomez-Camer, P. Novak, S. Trabesinger. Relationship between the Properties and Cycle Life of Si/C Composites as Performance-Enhancing Additives to Graphite Electrodes for Li-Ion Batteries, Journal of The Electrochemical Society, 164 (2) A190-A203 (2017).*

(Continued)

*Primary Examiner* — Carlos Barcena
(74) *Attorney, Agent, or Firm* — Lee IP Law, P.C.

(57) ABSTRACT

A negative electrode and a rechargeable lithium battery, the negative electrode including a current collector; and a negative active material layer on at least one surface of the current collector, the negative active material layer including a carbon negative active material and a conductive agent, wherein the conductive agent includes at least one of a fiber-shaped conductive agent having a average length of about 1 μm to about 200 μm and a particle-shaped conductive agent having a average long diameter of about 1 μm to about 20 μm, and a DD (Degree of Divergence) value defined by Equation 1 is about 24 or greater:

$$DD\text{ (Degree of Divergence)} = (I_a/I_{total}) * 100 \quad \text{[Equation 1]}$$

(Continued)

wherein, in Equation 1, Ia is a sum of peak intensities at non-planar angles measured by XRD using a CuKα ray, and Itotal is a sum of peak intensity at all angles measured by XRD using a CuKα ray.

16 Claims, 7 Drawing Sheets

Related U.S. Application Data which is a continuation of application No. 16/394,077, filed on Apr. 25, 2019, now Pat. No. 11,152,607.

(51) Int. Cl.

| | |
|---|---|
| ***H01M 4/58*** | (2010.01) |
| ***H01M 10/0525*** | (2010.01) |
| *H01M 4/02* | (2006.01) |

(56) References Cited

U.S. PATENT DOCUMENTS

| | | | |
|---|---|---|---|
| 11,201,329 | B2 | 12/2021 | Lee et al. |
| 2001/0016286 | A1 | 8/2001 | Senoo et al. |
| 2002/0086211 | A1 | 7/2002 | Umeno et al. |
| 2002/0119371 | A1 | 8/2002 | Haug et al. |
| 2004/0072076 | A1 | 4/2004 | Matsubara et al. |
| 2004/0219431 | A1 | 11/2004 | Ozaki et al. |
| 2006/0024579 | A1 | 2/2006 | Kolosnitsyn et al. |
| 2007/0128518 | A1 | 6/2007 | Uono et al. |
| 2008/0199777 | A1 | 8/2008 | Onishi et al. |
| 2008/0318133 | A1 | 12/2008 | Matsuyama et al. |
| 2009/0202917 | A1 | 8/2009 | Sotowa et al. |
| 2009/0214954 | A1 | 8/2009 | Onishi et al. |
| 2012/0021294 | A1 | 1/2012 | Zhamu et al. |
| 2012/0164530 | A1 | 6/2012 | Temmyo et al. |
| 2012/0196193 | A1 | 8/2012 | Sotowa et al. |
| 2013/0004850 | A1 | 1/2013 | Shon et al. |
| 2013/0065120 | A1 | 3/2013 | Miwa et al. |
| 2013/0143125 | A1 | 6/2013 | Tsujiko et al. |
| 2013/0177792 | A1 | 7/2013 | Takahata et al. |
| 2013/0248772 | A1 | 9/2013 | Jo |
| 2013/0288118 | A1 | 10/2013 | Kim et al. |
| 2014/0065478 | A1 | 3/2014 | Mitsuhashi et al. |
| 2014/0072877 | A1 | 3/2014 | Araki et al. |
| 2014/0134486 | A1 | 5/2014 | Uchida et al. |
| 2014/0166939 | A1 | 6/2014 | Park et al. |
| 2014/0227588 | A1 | 8/2014 | Kim et al. |
| 2015/0010818 | A1 | 1/2015 | An et al. |
| 2015/0030931 | A1 | 1/2015 | Takahata et al. |
| 2015/0140452 | A1 | 5/2015 | Park et al. |
| 2016/0049637 | A1 | 2/2016 | Sohn et al. |
| 2016/0181612 | A1 | 6/2016 | Lee et al. |
| 2016/0268608 | A1 | 9/2016 | Nishimura et al. |
| 2017/0033350 | A1 | 2/2017 | Mizuno et al. |
| 2017/0062822 | A1 | 3/2017 | Hwang |
| 2017/0133681 | A1 | 5/2017 | Ko et al. |
| 2018/0013141 | A1 | 1/2018 | Yoshioka et al. |
| 2018/0123120 | A1 | 5/2018 | Lee et al. |
| 2018/0123131 | A1 | 5/2018 | Lee et al. |
| 2018/0175391 | A1 | 6/2018 | Komura et al. |
| 2019/0140271 | A1 | 5/2019 | Hirose et al. |
| 2019/0326598 | A1 | 10/2019 | Lee et al. |
| 2019/0334161 | A1 | 10/2019 | Lee et al. |

FOREIGN PATENT DOCUMENTS

| | | | |
|---|---|---|---|
| CN | 102341346 | A | 2/2012 |
| CN | 103119774 | A | 5/2013 |
| CN | 103378357 | A | 10/2013 |
| CN | 103988344 | A | 8/2014 |
| CN | 105374981 | A | 3/2016 |
| CN | 105849942 | A | 8/2016 |
| CN | 106684326 | A | 5/2017 |
| EP | 1032068 | A2 | 8/2000 |
| EP | 2 538 484 | A1 | 12/2012 |
| EP | 2541664 | A2 | 1/2013 |
| EP | 2 660 903 | A1 | 11/2013 |
| EP | 2 709 193 | B1 | 6/2015 |
| JP | 09-219199 | A | 8/1997 |
| JP | 3705801 | B1 | 10/2005 |
| JP | 4150516 | B2 | 9/2008 |
| JP | 2012-033375 | A | 2/2012 |
| JP | 2013-004307 | A | 1/2013 |
| JP | 2013-069432 | A | 4/2013 |
| JP | 2014-029833 | A | 2/2014 |
| JP | 2014-086258 | A | 5/2014 |
| JP | 2014-096386 | A | 5/2014 |
| JP | 5556755 | B2 | 7/2014 |
| JP | 5652682 | B2 | 1/2015 |
| JP | 2015-138644 | A | 7/2015 |
| JP | 2016-131123 | A | 7/2016 |
| JP | 2017-016773 | A | 1/2017 |
| JP | 2017-063013 | A | 3/2017 |
| JP | 2017-063040 | A | 3/2017 |
| KR | 10-2013-0122471 | A | 6/2003 |
| KR | 2003-0052949 | A | 6/2003 |
| KR | 10-2008-0095562 | A | 4/2007 |
| KR | 10-2007-0046126 | A | 5/2007 |
| KR | 10-0912788 | B1 | 8/2009 |
| KR | 10-0954306 | B1 | 4/2010 |
| KR | 10-1014969 | B1 | 2/2011 |
| KR | 10-1106966 | B1 | 1/2012 |
| KR | 10-1195081 | B1 | 10/2012 |
| KR | 10-2013-0060268 | A | 6/2013 |
| KR | 10-2014-0035256 | A | 3/2014 |
| KR | 10-1582718 | B1 | 12/2015 |
| KR | 10-1599322 | B1 | 2/2016 |
| KR | 10-2017-0002302 | A | 1/2017 |
| KR | 10-2019-0122437 | A | 10/2019 |
| KR | 10-2019-0125114 | A | 11/2019 |
| WO | WO 2012/039041 | A1 | 3/2012 |
| WO | WO 2013-088540 | A1 | 6/2013 |
| WO | WO 2013/108516 | A1 | 7/2013 |
| WO | WO 2015-093894 | A1 | 6/2015 |
| WO | WO 2016-098211 | A1 | 6/2016 |
| WO | WO 2017-085907 | A1 | 5/2017 |
| WO | WO 2018/012821 | A1 | 1/2018 |

OTHER PUBLICATIONS

Korean Office action received in related application dated Jul. 31, 2023.

U.S. Office action received in co-pending U.S. Appl. No. 18/226,906, dated Sep. 10, 2024.

Chinese Office action dated Apr. 27, 2025.

Billaud, J., et al., "Magnetically aligned graphite electrodes for high-rate performance Li-ion batteries", Nature Energy, vol. 1, Article No. 16097 No. 8, 4 (Jul. 4, 2016), pp. 1-6, Aug. 2016.

Imerys: Graphite and Carbon, TIMREX KS4 Technical Data Sheet, Jun. 2018.

Yim, C.H., et al., "A high capacity silicon-graphite composite as anode for lithium-ion batteries using low content amorphouse silicon and compatible binders", J. Mater. Chem. A 2013, 1, 8234-8243.

Office Action issued on Aug. 20, 2019 for related U.S. Appl. No. 15/800,297.

Final Rejection issued Aug. 20, 2019 for co-pending U.S. Appl. No. 15/799,238.

EESR issued Sep. 6, 2019 for EP 19171112.6 which corresponds with U.S. Appl. No. 16/394,077.

EESR issued Sep. 30, 2019 for EP 19169561.8 which corresponds with co-pending U.S. Appl. No. 16/382,331.

USPTO Notice of Allowance mailed Nov. 21, 2020, in U.S. Appl. No. 15/799,238.

USPTO Office Action mailed Feb. 4, 2020, in U.S. Appl. No. 15/800,297.

Chinese Office Action and Search Report dated Jun. 28, 2020 and Jun. 9, 2020.

Office Action received in co-pending U.S. Appl. No. 15/800,297.

(56) References Cited

OTHER PUBLICATIONS

Korean Office action dated Dec. 3, 2020.
Notice of Allowance received in co pending U.S. Appl. No. 15/800,297 dated Feb. 12, 2021.
Chinese Office action dated Mar. 16, 2021.
U.S. Office action received in co pending related U.S. Appl. No. 16/382,331 dated Apr. 14, 2021.
European Office action dated Jun. 10, 2021.
Korean Office action dated Aug. 31, 2021.
Third party Observation dated Jun. 23, 2021, received in corresponding European Application.
European Office Action dated Oct. 13, 2021.
Chinese Office action from CN201910339767.X dated Jan. 25, 2022.
Chinese Office action from CN201910303137.7 dated Feb. 7, 2022.
European Office action from EP 19171112.6 dated Feb. 9, 2022.
Chinese Notice of Allowance and Search Report dated Jul. 8, 2022.
Chinese Office action dated Sep. 5, 2022.
European Office action dated Sep. 21, 2022.
Final Rejection dated Sep. 30, 2022, received in co pending U.S. Appl. No. 17/537,765.
Office action dated Jan. 4, 2023, received in co-pending U.S. Appl. No. 17/537,765.
Chinese Notice of Allowance dated Jan. 29, 2023, with Search Report dated Jan. 18, 2023.
J. B. Kim, et al. “Effect of Dispersion methods on the mechanical and electromagnetic properties of VGCF/Epoxy composites”, 16th International Conference of Composite Materials 2007.
U.S. Office action received in copending U.S. Appl. No. 17/498,861, mailed Nov. 9, 2023.
U.S. Office action received in copending U.S. Appl. No. 18/226,906.

* cited by examiner

RECHARGEABLE ELECTRODE FOR RECHARGEABLE LITHIUM BATTERY AND RECHARGEABLE LITHIUM BATTERY INCLUDING THE SAME

CROSS-REFERENCE TO RELATED APPLICATIONS

This is a continuation-in-part application based on pending application Ser. No. 17/498,861, filed Oct. 12, 2021, which in turn is a continuation of application Ser. No. 16/394,077, filed Apr. 25, 2019, now U.S. Pat. No. 11,152,607 B2, issued Oct. 19, 2021, the entire contents of both being hereby incorporated by reference.

Korean Patent Application No. 10-2018-0049447, filed on Apr. 27, 2018, in the Korean Intellectual Property Office, and entitled: "Negative Electrode for Rechargeable Lithium Battery, and Rechargeable Lithium Battery Including Same," is incorporated by reference herein in its entirety.

BACKGROUND

1. Field

Embodiments relate to a negative electrode for a rechargeable lithium battery and a rechargeable lithium battery including the same.

2. Description of the Related Art

A rechargeable lithium battery has recently drawn attention as a power source for small portable electronic devices. The rechargeable lithium battery uses an organic electrolyte solution and thereby, have twice as high a discharge voltage as a conventional battery using an alkali aqueous solution and accordingly, high energy density.

As for a positive active material of a rechargeable lithium battery, a lithium-transition metal oxide having a structure capable of intercalating lithium ions, such as $LiCoO_2$, $LiMn_2O_4$, $LiNi_{1-x}Co_xO_2$ ($0<x<1$), and the like may be used.

SUMMARY

The embodiments may be realized by providing a negative electrode for a rechargeable lithium battery, the negative electrode including a current collector; and a negative active material layer on at least one surface of the current collector, the negative active material layer including a carbon negative active material and a conductive agent, wherein the conductive agent includes at least one of a fiber-shaped conductive agent having a average length of about 1 μm to about 200 μm and a particle-shaped conductive agent having a average long diameter of about 1 μm to about 20 μm, and a DD (Degree of Divergence) value defined by Equation 1 is about 24 or greater:

$$DD \text{ (Degree of Divergence)} = (I_a/I_{total}) * 100 \quad \text{[Equation 1]}$$

wherein, in Equation 1, $I_a$ is a sum of peak intensities at non-planar angles measured by XRD using a CuKα ray, and $I_{total}$ is a sum of peak intensity at all angles measured by XRD using a CuKα ray.

The negative electrode may have a DD value of about 24 to about 70.

The conductive agent may include at least one of a fiber-shaped conductive agent having an average length of about 5 μm to about 50 μm and a particle-shaped conductive agent having an average long diameter of about 5 μm to about 10 μm.

The conductive agent may have a specific external surface area of about 4 $\mu m^2/g$ to about 1,500 $\mu m^2/g$.

The conductive agent may have an aspect ratio of about 10 to about 3,000.

The conductive agent may have an area ratio, based on a surface area, relative to the carbon negative active material of about 50% to about 300%.

The conductive agent may have a volume ratio of the conductive agent relative to the carbon negative active material of about 1.5% or less.

The specific external surface area of the conductive agent may be about 100 $m^2/g$ to about 1,400 $\mu m^2/g$.

The aspect ratio may be about 10 to about 2,500.

The area ratio, based on a surface area, of the conductive agent relative to the carbon negative active material may be about 80% to about 260%.

The volume ratio of the conductive agent relative to the carbon negative active material may be about 0.005% to about 1.5%.

The negative electrode may have a single surface loading level (L/L) of about 6 $mg/cm^2$ to about 65 $\mu mg/cm^2$.

The $I_a$ may be a sum of peak intensities at 2θ=42.4±0.2°, 43.4±0.2°, 44.6±0.2°, and 77.5±0.2° measured by XRD using a CuKα ray, and the $I_{total}$ may be a sum of peak intensities at 2θ=26.5±0.2°, 42.4±0.2°, 43.4±0.2°, 44.6±0.2°, 54.7±0.2°, and 77.5±0.2° measured by XRD using a CuKα ray.

The peak intensities may be peak integral area values.

The negative electrode may have a peak intensity ratio at a (004) plane relative to a (002) plane of about 0.04 or greater when XRD is measured by using a CuKα ray.

The negative electrode may have a peak intensity ratio at a (004) plane relative to a (002) plane of about 0.04 to about 0.07 when XRD is measured by using a CuKα ray.

The carbon negative active material may be artificial graphite or a mixture of artificial graphite and natural graphite.

The negative active material layer may further include a Si negative active material, a Sn negative active material, a lithium vanadium oxide, or a combination thereof.

The negative electrode may have an active region facing a positive electrode and an inactive region not facing the positive electrode, and a DD value of the inactive region may be about 24 or greater.

The embodiments may be realized by providing a rechargeable lithium battery including the negative electrode according to an embodiment; a positive electrode; and an electrolyte.

The rechargeable lithium battery may be a high power battery. The battery according to embodiments may be an all-solid battery. The negative electrode according to embodiments may be a dry electrode.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
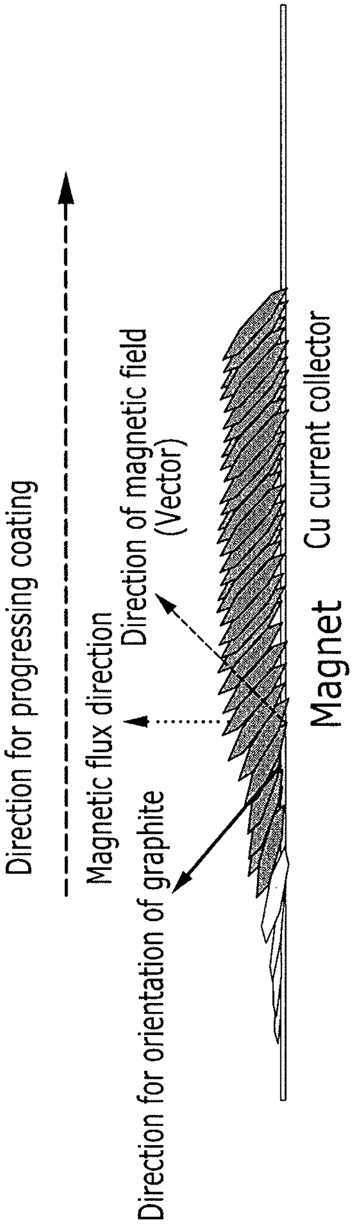
FIG. 1 illustrates a schematic view showing orientations of negative active materials.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when an element is referred to as being "between" two elements, it can be the only element between the two elements, or one or more intervening elements may also be present. Like reference numerals refer to like elements throughout.

A negative electrode for a rechargeable lithium battery according to an embodiment may include a current collector and a negative active material layer on the current collector and including a carbon negative active material and a conductive agent. The conductive agent may include, e.g., a fiber-shaped conductive agent having an average length of about 1 μm to about 200 μm or a particle-shaped conductive agent having an average size (long diameter or maximum dimension) of about 1 μm to about μm. A DD (Degree of Divergence) value of the negative electrode, as defined by Equation 1, may be about 24 or greater.

$$DD \text{ (Degree of Divergence)} = (I_a/I_{total}) * 100 \qquad \text{[Equation 1]}$$

In Equation 1, $I_a$ is a sum of peak intensities at non-planar angles measured by XRD using a CuKα ray, and $I_{total}$ is a sum of peak intensities at all angles measured by XRD using a CuKα ray.

In an implementation, the non-planar angles denote 2θ=42.4±0.2°, 43.4±0.2°, 44.6±0.2°, and 77.5±0.2° when measured by XRD using a CuKα ray, that is, a (100) plane, a (101)R plane, a (101)H plane, and a (110) plane. In general, graphite has a structure classified into a hexagonal structure and a rhombohedral structure having an ABAB type stacking sequence of stacking graphene layers, and the R plane denotes the rhombohedral structure, while the H plane denotes the hexagonal structure.

In an implementation, all the angles denote 2θ=26.5±0.2°, 42.4±0.2° 43.4±0.2°, 44.6±0.2°, 54.7±0.2°, and 77.5±0.2° when measured by XRD using a CuKα ray, that is, a (002) plane, a (100) plane, a (101)R plane, a (101)H plane, a (004) plane, and a (110) plane. In an implementation, a peak at 2θ=43.4±0.2° may appear when a peak of a (101)R plane of a carbon negative active material is overlapped with another peak of a (111) plane of a current collector, for example, Cu.

In an implementation, peak intensity indicates a height of a peak or an integral area of the peak. In an implementation, the peak intensity indicates the integral area of a peak.

In an implementation, the XRD is measured under a measurement condition of 2θ=10° to 80°, a scan rate (°/S) of 0.044 to 0.089, and a step size (°/step) of 0.013 to 0.039 by using a CuKα ray as a target ray but removing a monochromator to improve a peak intensity resolution.

In an implementation, the DD value of the negative electrode may be about 24 or greater, for example about 24 to about 70 or about 24 to about 60.

The DD value within the above ranges means that the negative active material is not sufficiently or completely laid horizontally within the current collector but may be sufficiently oriented to facilitate movement of Li ions in the negative electrode, e.g., control of random orientation. Maintaining the DD value at 24 or greater may help prevent an increase in the DC internal resistance, thereby preventing a deterioration in rate capability, particularly high-rate cycle-life characteristics.

In an implementation, within the ranges of the DD value, it is possible to suppress an increase in resistance at the discharge end, to minimize a DC internal resistance (DC-IR), and to exhibit improved cycle life characteristics. In addition, electrode expansion may be suppressed during charge and discharge to improve energy density.

In addition, within the ranges of the DD value, it means that the carbon negative active material is oriented at a specific angle with respect to the current collector, and heat generated during charge and discharge of the battery using the negative electrode including the carbon negative active material and heat generated by short-circuiting during penetration or collision may be vertically diffused and may be easily released outside. This may help suppress ignition caused by thermal runaway and may help suppress an internal temperature increase of the battery, and thus battery characteristics may be improved. If the DD value were to be less than 24, it indicates that the carbon negative active material is arranged substantially horizontally in the current collector. In this case, generated heat is horizontally diffused, so that it is not easily released outside.

The DD value of the negative electrode within the ranges means that a negative active material included in a negative active material layer is oriented at a predetermined angle, and this DD value is maintained after charges and discharges. In general, in order to orient a negative active material included in a negative active material layer at a predetermined angle, a magnetic field may be applied, while a negative active material composition is coated on a current collector.

In an implementation, the negative electrode satisfying the DD value may be manufactured by adjusting an intensity of the magnetic field, a time of exposure to the magnetic field, or an electrode plate density during compression of the negative electrode.

Hereinafter, a method of manufacturing the negative electrode is described. As shown in FIG. 1, the negative electrode is manufactured by placing a current collector on and/or under a magnet, and then applying a negative active material composition including a negative active material on a current collector, exposing it to a magnetic field, and then drying and compressing.

In an implementation, the magnet may have an intensity of a magnetic field in a range of about 1,000 Gauss to about 10,000 Gauss. In an implementation, the negative active material composition is coated on the current collector and maintained for about 2 seconds to about 9 seconds, e.g., may be exposed to the magnetic field for about 2 seconds to about 9 seconds. After the compressing, an electrode plate density of the negative electrode may be about 1.4 g/cc to about 1.6 g/cc. As used herein, the electrode plate density refers to a density calculated by dividing a loading amount of a measured electrode plate by a thickness of the electrode plate during compression. As described above, the DD value may be adjusted within the ranges by controlling an intensity of the magnetic field, a time of exposure to the magnetic field, or an electrode plate density during compression of the negative electrode.

For example, when the coating process is performed while the current collector is moved, the magnetic field (magnetic flux) by the magnet may be formed vertically with the current collector, but since the magnetic field according to a coating speed (a speed of moving the current collector) is formed at a predetermined angle as a vector function, the negative active material included in the negative active material composition may stand, e.g., may be oriented at the predetermined angle on the surface of the current collector.

The negative electrode may have a peak intensity ratio at a (004) plane relative to a (002) plane, that is, $I_{(004)}/I_{(002)}$ of about 0.04 or greater, e.g., about 0.04 to about 0.07 when XRD is measured by using a CuKα ray. When the negative electrode has $I_{(004)}/I_{(002)}$ of about 0.04 or greater, DC internal resistance may not be increased, but rate capabilities and particularly, high rate capability may be improved, and cycle-life characteristics may also be improved.

In an implementation, the negative electrode may have a peak intensity ratio at a (110) plane relative to a (004) plane, that is, $I_{(110)}/I_{(004)}$ of about 0.3 or greater, about 0.1 or greater, about 0.2 or greater, about 0.3 or greater, and/or less about 0.8 and about 0.7 or less when XRD is measured by using a CuKα ray. When the negative electrode has $I_{(110)}/I_{(004)}$ of about 0.1 or greater, DC internal resistance may not be increased and rate capabilities and particularly, high rate cycle-life characteristics may be improved. In an implementation, since the DD value is a peak value at a non-plane angle relative to a peak value at all the angles and thus not interlocked with $I_{(110)}/I_{(004)}$, the $I_{(110)}/I_{(004)}$ of about 0.1 or greater does not mean the DD value of about 24 or greater.

The negative electrode may have a peak intensity ratio, that is $I_{(101)H}/I_{(004)}$ of (101)H plane relative to (004) plane of about 0.4 or greater, e.g., about 0.4 to about 3.0 when XRD is measured by using a CuKα ray. When $I_{(101)H}/I_{(004)}$ of the negative electrode is about 0.4 or greater, DC internal resistance may not be increased and rate capability, particularly high-rate cycle-life characteristics may be improved.

In an implementation, the DD value is a value obtained by charging/discharging a rechargeable lithium battery including the negative electrode, dissembling the battery in a fully discharged state, and then measuring an XRD of the negative electrode. Herein, the charge and discharge is performed once to twice at 0.1 C to 0.2 C.

A BET specific surface area of the carbon negative active material may be less than about 5.0 μm$^2$/g, or about 0.6 μm$^2$/g to about 2.0 μm$^2$/g. When the BET specific surface area of the carbon negative active material is less than about 5.0 μm$^2$/g, electrochemical cycle-life characteristics of a battery may be improved. In an implementation, the BET may be measured by charging and discharging a lithium rechargeable battery including the carbon negative active material, completely discharging the battery down to less than or equal to about 3 V, disassembling the battery to obtain the negative electrode, cutting the negative electrode into a predetermined size, and putting the cut negative electrode in a BET sample holder in a nitrogen gas adsorption method.

The negative electrode may have a single surface loading level (L/L) of about 6 mg/cm$^2$ to about 65 μmg/cm$^2$.

The carbon negative active material may be artificial graphite or a mixture of artificial graphite and natural graphite. When the carbon negative active material is a crystalline carbon material obtained by mixing natural graphite with artificial graphite or artificial graphite, the crystalline carbon material may have more developed crystalline characteristics than an amorphous carbon negative active material and thus may further improve orientation characteristics of the carbon negative active material in an electrode plate about an external magnetic field. The artificial graphite or natural graphite may be, e.g., non-shaped, sheet-shaped, flake-shaped, spherically-shaped, fiber-shaped, or a combination thereof. In an implementation, the artificial graphite may be mixed with the natural graphite in a ratio of about 5:95 to about 95:5, e.g. about 30:70 to about 70:30.

In an implementation, the negative active material layer may further include a Si negative active material, a Sn negative active material, or a lithium vanadium oxide negative active material. When the negative active material layer further includes these materials, e.g., the carbon negative active material as a first negative active material and the negative active material as a second negative active material, the first and second negative active materials may be mixed in a weight ratio of about 50:50 to about 99:1.

The Si negative active material may be Si, a Si-C composite, $SiO_x$ (0<x<2), and a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof but not Si), and the Sn negative active material is selected from Sn, $SnO_2$, a Sn—R alloy (wherein R is an element selected from an alkali metal, an alkaline-earth metal, a Group 13 element, a Group 14 element, a Group 15 element, a Group 16 element, a transition metal, a rare earth element, and a combination thereof but not Sn), and the like and also, a mixture of at least one thereof with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The conductive agent may include, e.g., at least one of a fiber-shaped conductive agent having an average length of about 1 μm to about 200 μm and a particle-shaped conductive agent having an average size (long diameter) of about 1 μm to about 20 μm. In an implementation, the conductive agent may include, e.g., at least one of a fiber-shaped conductive agent having an average length of about 5 μm to about 50 μm and a particle-shaped conductive agent having an average size (long diameter) of about 5 μm to about 10 μm.

Examples of the fiber-shaped conductive agent may include a carbon nanotube, a vapor grown carbon fiber, a single-walled carbon nanotube (SWCNT), and a multi-walled carbon nanotube (MWCNT).

The particle-shaped conductive agent may have a shape such as a spherical shape, an elliptical shape, a flake shape, and the like. Examples thereof may include flake graphite such as SFG series (for example, SFG6, SFG10, SFG15, etc., manufactured by TIMCAL TIMREX).

In the negative electrode having the DD value of about 24 or greater, high-rate cycle-life characteristics may be improved when graphite is oriented (the effect of improving resistance characteristics of the ion movement according to the orientation), but the cycle-life may be lowered at low rates. This may be because of a large electronic resistance due to influence of a conductive network between particles at low rates. The conductive agent satisfying the length and/or the size according to an embodiment may be added to the negative active material layer in which the negative active material is oriented, thereby effectively improving a conductive network and improving electrical conductivity of the electrode plate, and thus a cycle-life maintenance rate at a low rate as well as high-rate cycle-life characteristics may be improved.

A specific surface area based on a surface area of the conductive agent may be about 4 $\mu m^2/g$ to about 1,500 $\mu m^2/g$, e.g., about 50 $\mu m^2/g$ to about 1,400 $\mu m^2/g$, or about 100 $m^2/g$ to about 1,400 $\mu m^2/g$.

The specific surface area refers to a specific surface area of the conductive agent based on the surface area, and unlike a conventional BET specific surface area, it refers to a specific surface area of the (e.g., externally exposed portions of the) surface not including the surface area of an internal pore. The specific surface area based on the surface area is a value calculated based on only the surface area that is actually in contact (e.g., or exposed). For example, the specific surface area based on a surface area may be referred to as the specific external surface area.

The specific surface area based on a surface area may be calculated according to Equation 2.

Specific surface area based on a surface area = Surface area per one (e.g., particle of) conductive agent/mass per one (e.g., particle of) conductive agent [Equation 2]

In Equation 2, the mass of one conductive agent may be calculated according to Equation 3.

Mass per one conductive agent = volume of one (e.g., particle of) conductive agent × true density [Equation 3]

In Equation 2, each surface area per one conductive agent may be calculated assuming that the fiber-shaped conductive agent is a circular cylinder and the particle-shaped conductive agent is a sphere.

When the negative active material layer includes a conductive agent having the specific surface area based on a surface area of about 4 $\mu m^2/g$ to about 1,500 $\mu m^2/g$, contact areas between the conductive agent and the negative active material may be increased and a conductive network may be effectively improved, and thereby improving electrical conductivity of the electrode plate and cycle-life characteristics of a rechargeable battery.

In an implementation, the conductive agent may have an aspect ratio of about 10 to about 3,000, e.g., about 10 or greater, about 20 or greater, or about 30 or greater and about 2,600 or less, about 2,500 or less, about 2,400 or less, or about 2,300 or less. The aspect ratio may be calculated as a length/a diameter in the case of the fiber-shaped conductive agent and may be calculated as a major axis length/a minor axis length in the case of the particle-shaped conductive agent. When the particle-shaped conductive agent has a flake shape, the aspect ratio may be calculated as a length/a thickness in the case of the flake-shaped conductive agent.

When the negative active material layer includes a conductive agent satisfying the aspect ratio, an area in contact with the negative active material may be sufficiently secured, and a conductive network may be effectively improved, thereby improving electrical conductivity of the electrode plate and cycle-life characteristics of a rechargeable battery.

In an implementation, the conductive agent may have an area ratio based on a surface area relative to the carbon negative active material of about 50% to about 300%, e.g., about 55% or greater, about 60% or greater, about 70% or greater, or about 80% or greater, and about 280% or less, about 270% or less, about 260% or less, about 250% or less, or about 240% or less. When the area ratios are satisfied, an area in contact with the negative active material may be increased, a conductive network may be effectively improved and thereby improving electrical conductivity of the electrode plate and cycle-life characteristics of a rechargeable battery. For example, an area ratio of conductive agent to carbon negative active material at the surface of the negative electrode may be about 1:2 to about 3:1.

In an implementation, the conductive agent may have a volume ratio of the conductive agent relative to the carbon negative active material of about 1.5% or less, e.g., about 0.005% or greater, about 0.01% or greater, or about 0.02% or greater and about 1.4% or less, about 1.3% or less, or about 1.2% or less. When the volume ratios are satisfied, it is possible to help suppress the clogging of the channel in the electrode plate due to the conductive agent and to prevent a reduction of ion conductivity.

In an implementation, the negative active material layer may further include a binder in addition to the carbon negative active material and the conductive agent. In this case, the negative active material layer may include about 90 wt % to about 98 wt % of the carbon negative active material, about 1 wt % to about 5 wt % of the binder, and about 1 wt % to about 5 wt % of the conductive agent.

The binder improves binding properties of negative active material particles with one another and with a current collector. The binder may be a non-aqueous binder, an aqueous binder, or a combination thereof.

The non-aqueous binder may include polyvinyl chloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The aqueous binder may include a styrene-butadiene rubber, an acrylated styrene-butadiene rubber (SBR), an acrylonitrile-butadiene rubber, an acrylic rubber, butyl rubber, an ethylenepropylene copolymer, polyepichlorohydrine, polyphosphazene, polyacrylonitrile, polystyrene, an ethylenepropylenediene copolymer, polyvinylpyridine, chlorosulfonated polyethylene, latex, polyester resin, an acrylic resin, a phenolic resin, an epoxy resin, polyvinyl alcohol, an acrylate resin, or a combination thereof.

When the aqueous binder is used as a negative electrode binder, a cellulose compound may be further used to provide viscosity as a thickener. The cellulose compound may include carboxymethyl cellulose, hydroxypropylmethyl cellulose, methyl cellulose, or alkali metal salts thereof. The alkali metal may be Na, K, or Li. The thickener may be included in an amount of about 0.1 to about 3 parts by weight based on 100 parts by weight of the negative active material.

The current collector may include, e.g., a copper foil, a nickel foil, a stainless steel foil, a titanium foil, a nickel foam, a copper foam, a polymer substrate coated with a conductive metal, or a combination thereof.

Figure 2:
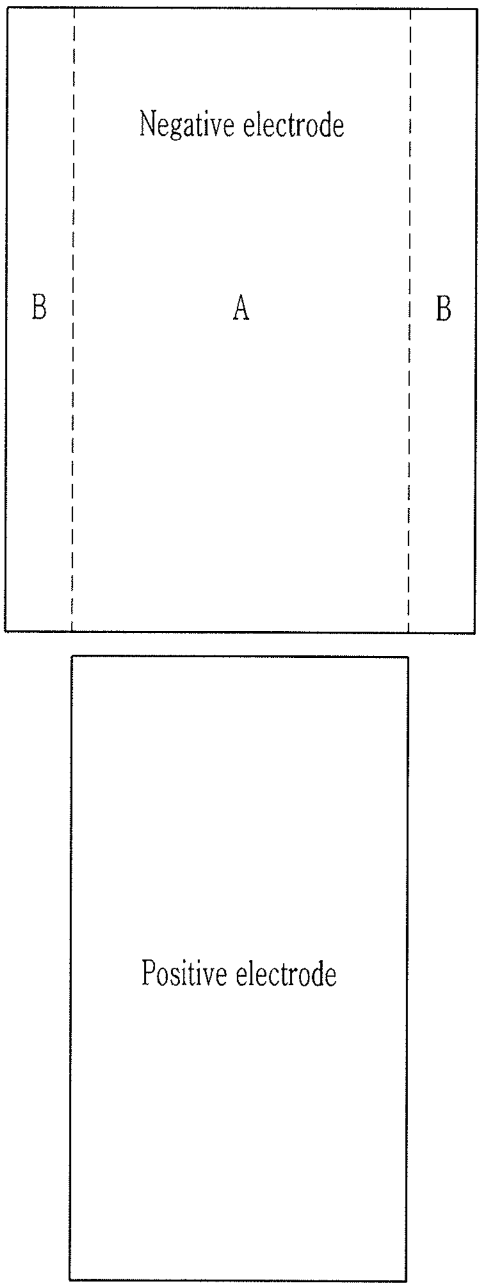
FIG. 2 illustrates a view showing active and inactive regions of a negative electrode of a rechargeable lithium battery.

According to another embodiment, the negative electrode may have an active region facing or overlapping a positive electrode and an inactive region not facing or not overlapping the positive electrode. For example, as shown in FIG. 2, a region (A) of the negative electrode facing the positive electrode is the active region, and another region (B) of the negative electrode not facing or overlapping the positive electrode is the inactive region. The reason is that the inactive region where the negative electrode does not face the positive electrode is formed, since the negative electrode is manufactured to be larger than the positive electrode to improve battery safety. However, as the inactive region is generated, safety regarding a short circuit between the positive and negative electrodes due to lithium deposition on the surface of the negative electrode which may occur during charging may be improved, the inactive region may have relatively larger resistance of lithium ions than the active region facing the positive electrode due to a long moving path of lithium ions transmitted from the positive electrode and is present as a non-buffering region. However, the DD value of the inactive region may be increased up to 24, lithium may be easily diffused, and capacity may be increased due to decrease of the non-buffering region.

In an implementation, the DD values of the active region and the inactive region may be about 24 or greater, e.g., about 24 to about 70. In an implementation, the DD value of the only inactive region may be about 24 or greater, e.g., about 24 to about 60. When the DD value of the only inactive region is about 24 or greater, the DD value of the active region may have a suitable value.

A rechargeable lithium battery according to another embodiment includes the negative electrode, a positive electrode, and an electrolyte.

The rechargeable lithium battery may be a high power battery. For example, the rechargeable lithium battery may be usefully applied to an electronic device requiring high power such as a power tool, an electric vehicle, a vacuum cleaner, and the like. The reason is that the rechargeable lithium battery including the negative electrode according to an embodiment may easily release heat generated during the charge and discharge and particularly, when applied to a high-capacity battery and an electronic device for high power and thus may be suppressed from deterioration due to the heat and effectively used as a high power battery. In addition, the rechargeable lithium battery may easily release heat according to the charge and discharge and be effectively suppressed from a battery temperature increase and thus effectively improve cycle-life characteristics and particularly, cycle-life characteristics at a high rate.

This high power battery may be a cylindrical battery, a prismatic battery, or a pouch-type battery. The battery according to embodiments may be an all-solid battery. The negative electrode according to embodiments may be a dry electrode.

The positive electrode may include a positive current collector and a positive active material layer formed on the positive current collector. The positive active material may include lithiated intercalation compounds that reversibly intercalate and deintercalate lithium ions. For example, one or more composite oxides of a metal selected from cobalt, manganese, nickel, and a combination thereof, and lithium may be used. For example, the compounds represented by one of the following chemical formulae may be used. $Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.5, 0≤a≤2); $Li_aNi_{1-b-c}Co_bX_cO_{2-\alpha}T_\alpha$ (0.90≤a≤1.8, 0≤b ≤0.5, 0≤c≤0.05, 0≤a≤2); $Li_aNi_{1-b-c}Co_bX_cO_{2-\alpha}T_2$ (0.90≤a≤1.8, 0≤b≤0.5, 0≤c≤0.05, 0≤a≤2); $Li_aNi_{1-c}Mn_bX_cD_\alpha$ (0.90≤a≤1.8, ≤b≤0.5, 0≤c≤0.05, 0≤a≤2); $Li_aNi_{1-b-c}Mn_bX_cO_{2-\alpha}T_\alpha$ (0.90≤a≤1.8, 0≤b≤0.5, 0≤c≤0.05, 0≤a≤2); $Li_aNi_{1-b-c}Mn_bX_cO_{2-\alpha}T_2$ (0.90≤a≤1.8, 0≤b≤0.5, 0≤c≤0.05, 0≤a≤2); $Li_aNi_bE_cG_dO_2$ (0.90≤a≤1.8, 0≤b≤0.9, 0≤c≤50.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1) $Li_aCoG_bO_2$ (0.90≤a 1. 8, 0.001≤b≤0.1); $Li_aMn_{1-b}G_bO_2$ (0.90≤a≤1.8, 0.001≤b≤0.1); $Li_aMn_2G_bO_4$ (0.90 a≤1.8, 0.001≤b≤0.1); $Li_aMn_{1-b}G_bPO_4$ (0.90 a≤1.8, 0≤g≤0.5); $QO_2$; $QS_2$; $LiQS_2$; $V_2O_5$; $LiV_2O_5$; $LiZO_2$; $LiNiVO_4$; $Li_{(3-f)}J_2(PO_4)_3$(0≤f≤2); $Li_{(3-f)}Fe_2(PO_4)_3$(0≤f≤2); or $Li_aFePO_4$ (0.90≤a≤1.8).

In the above chemical formulae, A may be selected from Ni, Co, Mn, and a combination thereof, X may be selected from Al, Ni, Co, Mn, Cr, Fe, Mg, Sr, V, a rare earth element, and a combination thereof, D may be selected from O, F, S, P, and a combination thereof, E may be selected from Co, Mn, and a combination thereof, T may be selected from F, S, P, and a combination thereof, G may be selected from Al, Cr, Mn, Fe, Mg, La, Ce, Sr, V, and a combination thereof, Q may be selected from Ti, Mo, Mn, and a combination thereof, Z may be selected from Cr, V, Fe, Sc, Y, and a combination thereof, and J may be selected from V, Cr, Mn, Co, Ni, Cu, and a combination thereof.

The compounds may have a coating layer on the surface, or may be mixed with another compound having a coating layer. The coating layer may include an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. For example, the method may include any coating method, which is known in the related field of the present invention and may be appropriately selected so long as they do not deviate from the scope of the present invention.

In the positive electrode, a content of the positive active material may be about 90 wt % to about 98 wt % based on a total weight of the positive active material layer.

In an implementation, the positive active material layer may further include a binder and a conductive agent. Herein, the binder and the conductive agent may be included in an amount of about 1 wt % to about 5 wt %, respectively based on the total amount of the positive active material layer.

The binder improves binding properties of positive active material particles with one another and with a current collector. Examples thereof may include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene butadiene rubber, an acrylated styrene butadiene rubber, an epoxy resin, nylon, and the like.

The conductive agent may be included to provide electrode conductivity. Any electrically conductive agent may be used as a conductive material unless it causes a chemical change. Examples of the conductive agent include a carbon material such as natural graphite, artificial graphite, carbon black, acetylene black, ketjen black, a carbon fiber and the like; a metal material of a metal powder or a metal fiber including copper, nickel, aluminum, silver, and the like; a conductive polymer such as a polyphenylene derivative; or a mixture thereof.

In an implementation, the current collector may use, e.g., Al.

The electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate, ester, ether, ketone, alcohol, or aprotic solvent.

The carbonate solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester solvent may include methyl acetate, ethyl acetate, n-propyl acetate, dimethylacetate, methylpropionate, ethylpropionate, decanolide, mevalonolactone, caprolactone, and the like. The ether solvent may include dibutyl ether, tetraglyme, diglyme, dimethoxyethane, 2-methyltetrahydrofuran, tetrahydrofuran, and the like. The ketone solvent includes cyclohexanone, and the like. The alcohol solvent include ethyl alcohol, isopropyl alcohol, and the like, and examples of the aprotic solvent include nitriles such as R-CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

The organic solvent may be used alone or in combination of two or more. When a plurality of organic solvents are used, a mixing ratio may be appropriately adjusted according to performance of a desired battery, which is well known in the technical field of the present invention.

The carbonate solvent may include a mixture with a cyclic carbonate and a chain carbonate. The cyclic carbonate and chain carbonate may be mixed together in a volume ratio of about 1:1 to about 1:9. When the mixture is used as an electrolyte, it may have enhanced performance.

The organic solvent may further include an aromatic hydrocarbon solvent as well as the carbonate solvent. The carbonate solvent and aromatic hydrocarbon solvent may be mixed together in a volume ratio of about 1:1 to about 30:1.

The aromatic hydrocarbon organic solvent may be an aromatic hydrocarbon compound represented by Chemical Formula 1.

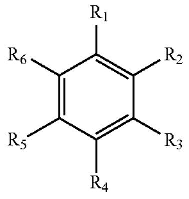

In Chemical Formula 1, $R_1$ to $R_6$ are the same or different and are selected from hydrogen, a halogen, a C1 to C10 alkyl group, a haloalkyl group, and a combination thereof.

Examples of the aromatic hydrocarbon organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include an additive of vinylene carbonate, an ethylene carbonate compound represented by Chemical Formula 2, or propanesultone to improve a cycle life.

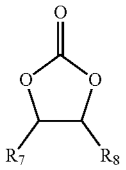

In Chemical Formula 2, $R_7$ and $R_8$ are the same or different and may be each independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group, and $R_7$ and $R_8$ are not simultaneously hydrogen.

Examples of the ethylene carbonate compound may include difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle life may be flexibly used within an appropriate range.

The lithium salt dissolved in an organic solvent supplies a battery with lithium ions, basically operates the rechargeable lithium battery, and improves transportation of the lithium ions between positive and negative electrodes. Examples of the lithium salt may include $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers, for example integers of 1 to 20), LiCl, LiI, and $LiB(C_2O_4)_2$ (lithium bis(oxalato) borate; LiBOB). A concentration of the lithium salt may range from about 0.1 M to about 2.0 M. When the lithium salt is included at the above concentration range, an electrolyte may have excellent performance and lithium ion mobility due to optimal electrolyte conductivity and viscosity.

A separator may be included between the positive electrode and the negative electrode depending on types of the rechargeable lithium battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Figure 3:
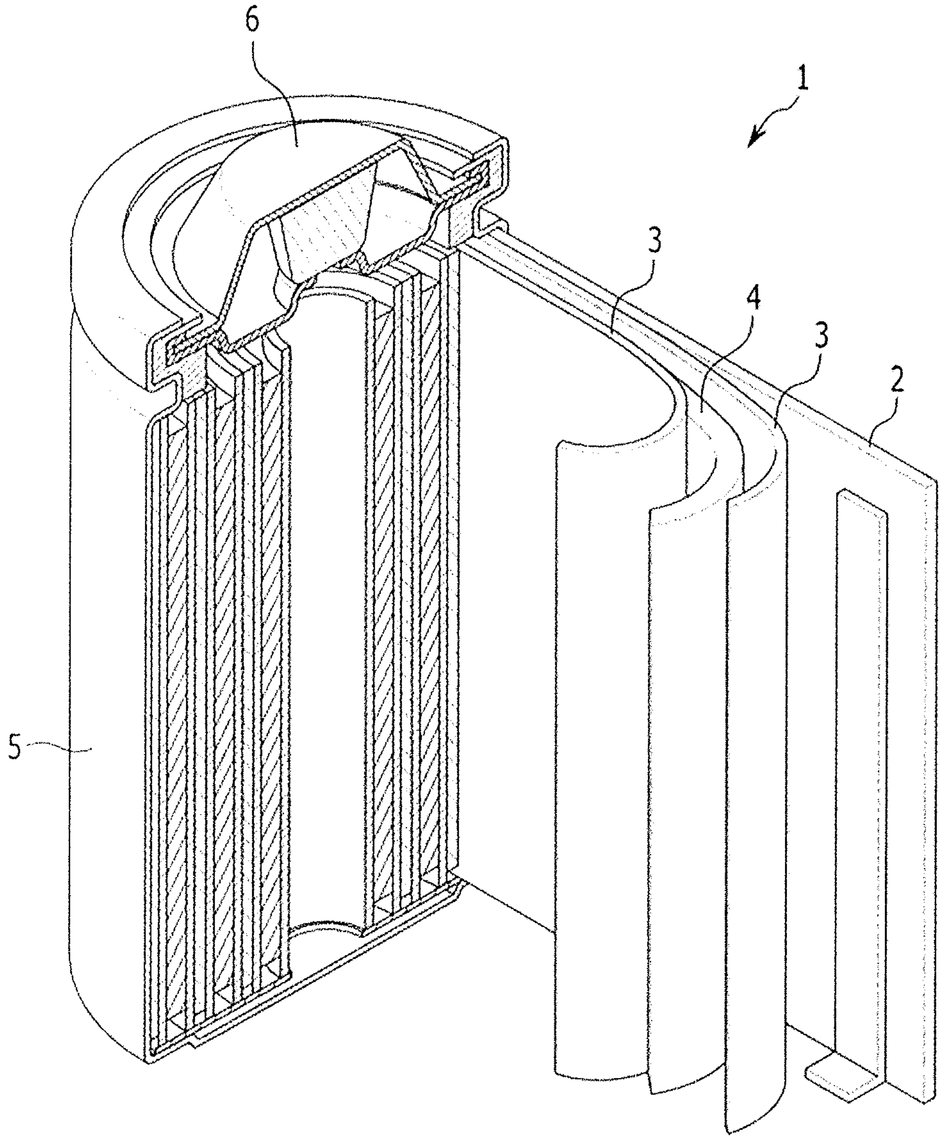
FIG. 3 illustrates a schematic view showing the structure of a rechargeable lithium battery.

FIG. 3 illustrates an exploded perspective view of a rechargeable lithium battery according to an embodiment. The rechargeable lithium battery shown in FIG. 3 is a cylindrical battery. In an implementation, the rechargeable lithium battery may be a prismatic battery or a pouch battery.

Referring to FIG. 3, a rechargeable lithium battery 1 according to an embodiment includes an electrode assembly including a positive electrode 2; a negative electrode 4; and a separator 3 disposed between the positive electrode 2 and the negative electrode 4; an electrolyte solution (not shown) impregnated in the electrode assembly; a battery case 5 housing the electrode assembly; and a sealing member 6 sealing the battery case 5.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Conductive agents used in Examples, Comparative Examples, and Reference Examples are shown in Table 1.

TABLE 1

| Types of conductive agent | Length (μm) | Specific surface area ($m^2/g$) | Aspect ratio | Surface area ratio (%) | Volume ratio (%) |
|---|---|---|---|---|---|
| SWCNT | 5 | 1,333.60 | 2,500 | 257% | 0.02% |
| MWCNT | 5 | 133.36 | 250 | 103% | 0.06% |
| SFG6 | 5 | 4.21 | 10 | 78% | 1.16% |
| DB | 0.035 | 89.87 | 1 | 349% | 0.26% |

Example 1-1

97.45 wt % of artificial graphite, 1.5 wt % of styrene butadiene rubber, 0.05 wt % of an SWCNT conductive agent of Table 1, and 1 wt % of carboxymethyl cellulose were mixed in water to prepare negative active material slurry.

After disposing a Cu foil on a magnet having an intensity of a magnetic field of 3,000 Gauss, the negative active material slurry was coated on the Cu foil, exposed to the magnetic field for 9 seconds, while the Cu foil was being moved, and then, dried and compressed to manufacture a negative electrode having electrode plate density of 1.45 g/cc and a single surface loading level (L/L) of 6.2 μmg/$cm^2$.

A positive active material slurry was prepared by mixing 96 wt % of a $LiCoO_2$ positive active material, 2 wt % of a carbon black conductive agent, and 2 wt % of a polyvinylidene fluoride binder in an N-methylpyrrolidone solvent. The slurry was coated on an Al substrate and then, dried and compressed to manufacture a positive electrode.

The negative electrode, the positive electrode, and an electrolyte were used to manufacture a pouch-type rechargeable lithium battery cell having cell capacity of 550 mAh and current density of 2.63 μmAh/$cm^2$. Herein, the electrolyte was prepared as a 1 M $LiPF_6$ solution in a mixed solvent of ethylene carbonate and diethyl carbonate (volume ratio of 50:50).

Example 1-2

A negative electrode and a rechargeable lithium battery cell using the same were manufactured according to the same method as Example 1-1 except that 97.3 wt % of artificial graphite, 1.5 wt % of styrene butadiene rubber, 0.2 wt % of an MWCNT conductive agent shown in Table 1, and 1 wt % of carboxymethyl cellulose were mixed in water.

Example 1-3

A negative electrode and a rechargeable lithium battery cell using the same were manufactured according to the same method as Example 1-1 except that 92.9 wt % of artificial graphite, 1.5 wt % of styrene butadiene rubber, 4.6 wt % of an SFG6 conductive agent (TIMCAL TIMREx) shown in Table 1, and 1 wt % of carboxymethyl cellulose were mixed in water.

Example 2-1

A negative electrode and a rechargeable lithium battery cell using the same were manufactured according to the same method as Example 1-1 except that the electrode plate density was 1.4 g/cc.

Example 2-2

A negative electrode and a rechargeable lithium battery cell using the same were manufactured according to the same method as Example 1-2 except that the electrode plate density was 1.4 g/cc.

Example 2-3

A negative electrode and a rechargeable lithium battery cell using the same were manufactured according to the same method as Example 1-3 except that the electrode plate density was 1.4 g/cc.

Example 3-1

A negative electrode and a rechargeable lithium battery cell using the same were manufactured according to the same method as Example 1-1 except that the electrode plate density was 1.6 g/cc.

Example 3-2

A negative electrode and a rechargeable lithium battery cell using the same were manufactured according to the same method as Example 1-2 except that the electrode plate density was 1.6 g/cc.

Example 3-3

A negative electrode and a rechargeable lithium battery cell using the same were manufactured according to the same method as Example 1-3 except that the electrode plate density was 1.6 g/cc.

Example 4-1

A negative electrode and a pouch-type rechargeable lithium battery cell using the same were manufactured according to the same method as Example 1-1 except that the exposure time to the magnetic field was changed from 9 seconds to 5 seconds.

Example 4-2

A negative electrode and a pouch-type rechargeable lithium battery cell using the same were manufactured according to the same method as Example 1-2 except that the exposure time to the magnetic field was changed from 9 seconds to 5 seconds.

Example 4-3

A negative electrode and a pouch-type rechargeable lithium battery cell using the same were manufactured according to the same method as Example 1-3 except that the exposure time to the magnetic field was changed from 9 seconds to 5 seconds.

Comparative Example 1-1

A negative active material slurry was prepared by mixing 96.5 wt % of artificial graphite, 1.5 wt % of styrene butadiene rubber, 1 wt % of a DB conductive agent (Denka Black, manufactured by Denka korea) shown in Table 1, and 1 wt % of carboxymethyl cellulose in water.

The negative active material slurry was coated on a Cu foil and then, dried and compressed to manufacture a negative electrode having electrode plate density of 1.45 g/cc and a single surface loading level (L/L) of 6.2 μmg/$cm^2$.

The negative electrode was used along with the positive electrode and the electrolyte used in Example 1-1 to manufacture a pouch-type rechargeable lithium battery cell.

Comparative Example 1-2

A negative electrode and a pouch-type rechargeable lithium battery cell using the same were manufactured according to the same method as Comparative Example 1-1 except that 97.45 wt % of artificial graphite, 1.5 wt % of styrene butadiene rubber, 0.05 wt % of an SWCNT conductive agent shown in Table 1, and 1 wt % of carboxymethyl cellulose were mixed in water.

Comparative Example 2

A negative electrode and a pouch-type rechargeable lithium battery cell using the same were manufactured according to the same method as Example 1-1 except that the negative active material slurry was prepared by mixing 97.5 wt % of artificial graphite, 1.5 wt % of styrene butadiene rubber, and 1 wt % of carboxymethyl cellulose in water, and the exposure time to the magnetic field was changed from 9 seconds to 2 seconds.

Comparative Example 3

A negative electrode and a pouch-type rechargeable lithium battery cell using the same were manufactured according to the same method as Comparative Example 2 except that the exposure time to the magnetic field was changed from 2 seconds to 4 seconds, and the electrode plate density was 1.79 g/cc.

Reference Example 1

A negative electrode and a pouch-type rechargeable lithium battery cell using the same were manufactured according to the same method as Example 1-1 except that 96.5 wt % of artificial graphite, 1.5 wt % of styrene butadiene rubber, 1 wt % of a DB conductive agent shown in Table 1, and 1 wt % of carboxymethyl cellulose were mixed in water.

Measurement of X-ray Diffraction Characteristics

The rechargeable lithium battery cells according to Examples 1-1, 2-1, 3-1, and 4-1 and Comparative Examples 1-1, 2, and 3 were twice charged and discharged at 0.1 C and then completely discharged down to 2.75 V at 0.1 C. The completely-discharged battery cells were disassembled to obtain negative electrodes. As for these negative electrodes, an X'Pert (PANalytical B.V.) XRD equipment using a CuKα ray as a target ray was used, and a monochromator was removed in order to improve a peak intensity resolution. Herein, the measurement was performed under a condition of 2θ=10° to 80°, a scan rate (°/S)=0.06436, and a step size of 0.026°/step.

Figure 4:
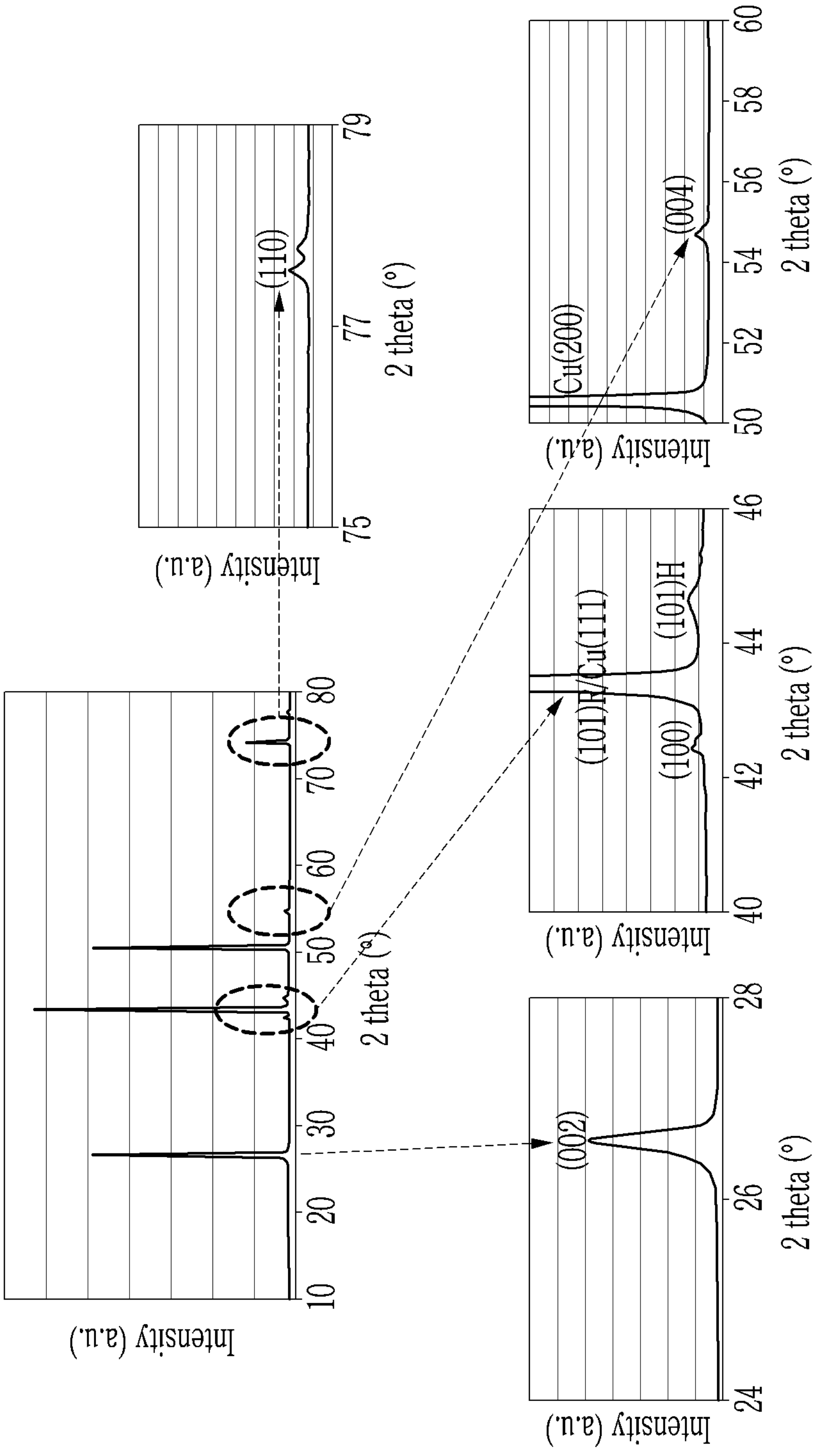
FIG. 4 illustrates a graph showing XRD peaks of the negative electrode according to Example 1-1 μmeasured using a CuKα ray.
Figure 5:
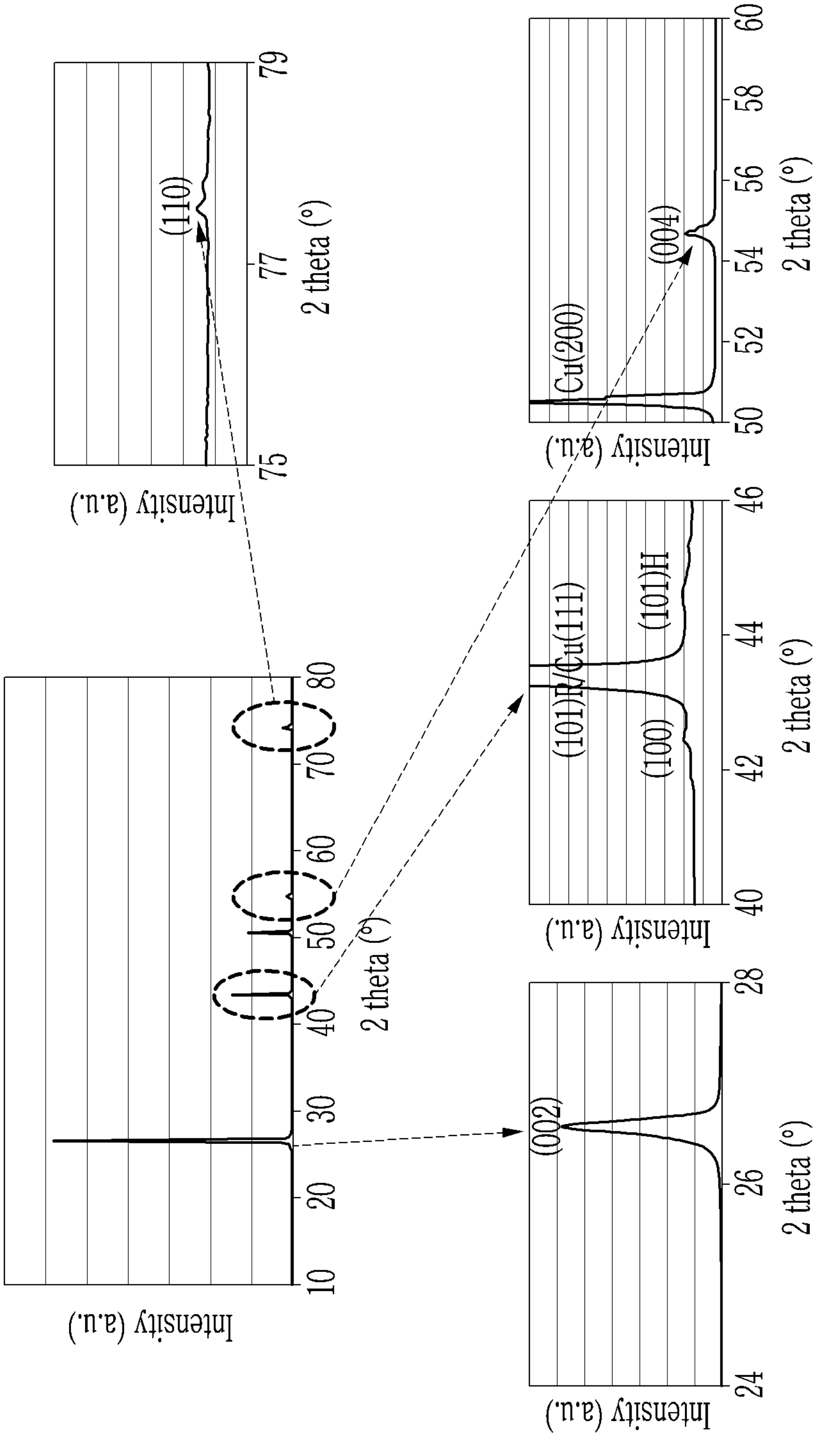
FIG. 5 illustrates a graph showing XRD peaks of the negative electrode according to Comparative Example 1-1 μmeasured using a CuKα ray.

The measured XRD results are shown in FIG. 4 (Example 1-1) and FIG. 5 (Comparative Example 1-1). As shown in FIGS. 4 and 5, the negative electrode of Comparative Example 1-1 showed a higher peak at 2θ=26.5±0.2° than the negative electrode of Example 1-1. In addition, as shown in FIGS. 4 and 5, the negative electrodes of Example 1-1 and Comparative Example 1-1 showed peaks at 2θ=26.5±0.2° ((002) plane), 42.4±0.2° ((100) plane), 43.4±0.2° ((101)R plane), 44.6±0.2° ((101)H plane), 54.7±0.2° ((004) plane), and 77.5±0.2° ((110) plane).

As shown in FIG. 4 and FIG. 5, the areas of the peaks shown at 2θ=26.5±0.2° ((002) plane), 42.4±0.2° ((100) plane), 43.4±0.2° ((101)R plane), 44.6±0.2° ((101)H plane), 54.7±0.2° ((004) plane), and 77.5±0.2° ((110) plane) were measured, and the results are shown in Table 2. In addition, the area sum of peaks shown at 2θ=42.4±0.2° ((100) plane), 43.4±0.2° ((101)R plane), 44.6±0.2° ((101)H plane), 77.5±0.2° ((110) plane) as $I_a$, the area sum of peaks shown at 2θ=26.5±0.2° ((002) plane), 42.4±0.2° ((100) plane), 43.4±0.2° ((101)R plane), 44.6±0.2° ((101)H plane), 54.7±0.2° ((004) plane), and 77.5±0.2° ((110) plane) as $I_{total}$ are shown in Table 2, and DD values $((I_a/I_{total})*100)$ were calculated therefrom and are shown in Table 2. Furthermore, $I_{(004)}/I_{(002)}$, $I_{(110)}/I_{(004)}$, and $I_{(101)H}/I_{(004)}$ were calculated and are shown in Table 2. In particular, peaks corresponding to the (101)R plane of graphite and the (111) plane of a Cu current collector at 43.4±0.2° were overlapped.

TABLE 2

| 2θ | Peak plane (peak index) | Peak area: Comparative Example 1-1 | Peak area: Example 1-1 |
|---|---|---|---|
| 26.5 ± 0.2° | (002) | 213953.00 | 48241.35 |
| 42.4 ± 0.2° | (100) | 444.15 | 884.48 |
| 43.4 ± 0.2° | (101R) | 38786.60 | 37534.77 |
| 44.6 ± 0.2° | (101H) | 1143.22 | 3961.18 |

TABLE 2-continued

| | | Peak area | |
|---|---|---|---|
| 2θ | Peak plane (peak index) | Comparative Example 1-1 | Example 1-1 |
| 54.7 ± 0.2° | (004) | 6737.48 | 2135.52 |
| 77.5 ± 0.2° | (110) | 317.47 | 830.47 |
| $I_{total}$ | | 261381.90 | 93587.77 |
| $I_a$ | | 40691.41 | 43210.90 |
| DD | | 15.60 | 46.20 |
| $I_{(004)}/I_{(002)}$ | | 0.03 | 0.04 |
| $I_{(110)}/I_{(004)}$ | | 0.047 | 0.389 |
| $I_{(101)H}/I_{(004)}$ | | 0.169 | 1.855 |

XRD of the rechargeable lithium battery cells according to Examples 2-1, 3-1, and 4-1 and Comparative Examples 2 and 3 were measured according to the same method as those of Examples 1-1 and Comparative Example 1-1 and used to calculate a DD value, $I_{(004)}/I_{(002)}$, $I_{(110)}/I_{(004)}$, and $I_{(101)H}/I_{(004)}$, and the results are shown in Table 3. The DD value, $I_{(004)}/I_{(002)}$, $I_{(110)}/I_{(004)}$, and $I_{(101)H}/I_{(004)}$ of the rechargeable lithium battery cells of Example 1-1 and Comparative Example 1-1 also are shown in Table 3 for comparison with the above results. The DD value, $I_{(004)}/I_{(002)}$, $I_{(110)}/I_{(004)}$, $I_{(101)H}/I_{(004)}$, $I_{(110)}/I_{(002)}$, and $I_{(002)}/I_{(110)}$, of the rechargeable lithium battery cells of Examples 1-1 to 1-4 and Comparative Examples 1-1 to 3 are shown in Table 3A.

TABLE 3

| | DD value | $I_{(004)}/I_{(002)}$ | $I_{(110)}/I_{(004)}$ | $I_{(101)H}/I_{(004)}$ |
|---|---|---|---|---|
| Example 1-1 | 46.20 | 0.04 | 0.389 | 1.855 |
| Example 2-1 | 52 | 0.041 | 0.6 | 2.76 |
| Example 3-1 | 40 | 0.058 | 0.387 | 1.99 |
| Example 4-1 | 24.6 | 0.0459 | 0.144 | 0.425 |
| Comparative Example 1-1 | 15.60 | 0.03 | 0.047 | 0.169 |
| Comparative Example 2 | 20.8 | 0.051 | 0.08 | 0.21 |
| Comparative Example 3 | 23.0 | 0.025 | 0.122 | 0.085 |

TABLE 3A

| | DD value | $I_{(004)}/I_{(002)}$ | $I_{(110)}/I_{(004)}$ | $I_{(101)}H/I_{(004)}$ | $I_{(110)}/I_{(002)}$ | $I_{(002)}/I_{(110)}$ |
|---|---|---|---|---|---|---|
| Example 1-1 | 46.20 | 0.04 | 0.389 | 1.855 | 0.016 | 64.3 |
| Example 2-1 | 52 | 0.041 | 0.6 | 2.76 | 0.025 | 40.7 |
| Example 3-1 | 40 | 0.058 | 0.387 | 1.99 | 0.022 | 44.6 |
| Example 4-1 | 24.6 | 0.0459 | 0.144 | 0.425 | 0.006 | 151.3 |
| Comparative Example 1-1 | 15.60 | 0.03 | 0.047 | 0.169 | 0.001 | 709.2 |
| Comparative Example 2 | 20.8 | 0.051 | 0.08 | 0.21 | 0.004 | 245.1 |
| Comparative Example 3 | 23.0 | 0.025 | 0.122 | 0.085 | 0.003 | 327.9 |

Referring to Table 3, the negative electrodes according to Examples 1-1, 2-1, 3-1, and 4-1 satisfied a DD value of 24 or greater (24.6 to 52), $I_{(004)}/I_{(002)}$ of 0.04 or greater, $I_{(110)}/I_{(004)}$ of 0.1 or greater, and $I_{(101)H}/I_{(004)}$ of 0.4 or greater. In addition, the negative electrode of Comparative Example 3 showed a DD value of 23 which is less than 24 but $I_{(110)}/I_{(004)}$ of 0.122 which is 0.1 or greater, and accordingly, the DD value and the $I_{(110)}/I_{(004)}$ were not interlocked each other.

Measurement of Direct Current Internal Resistance (DC-IR)

The rechargeable lithium battery cells according to Examples 1-1, 1-2, and 1-3, Comparative Examples 1-1 and 1-2, and Reference Example 1 were evaluated under a 0.1 C charge and discharge condition, and their discharge capacities were first measured and regarded as a 1 C reference.

Figure 6:
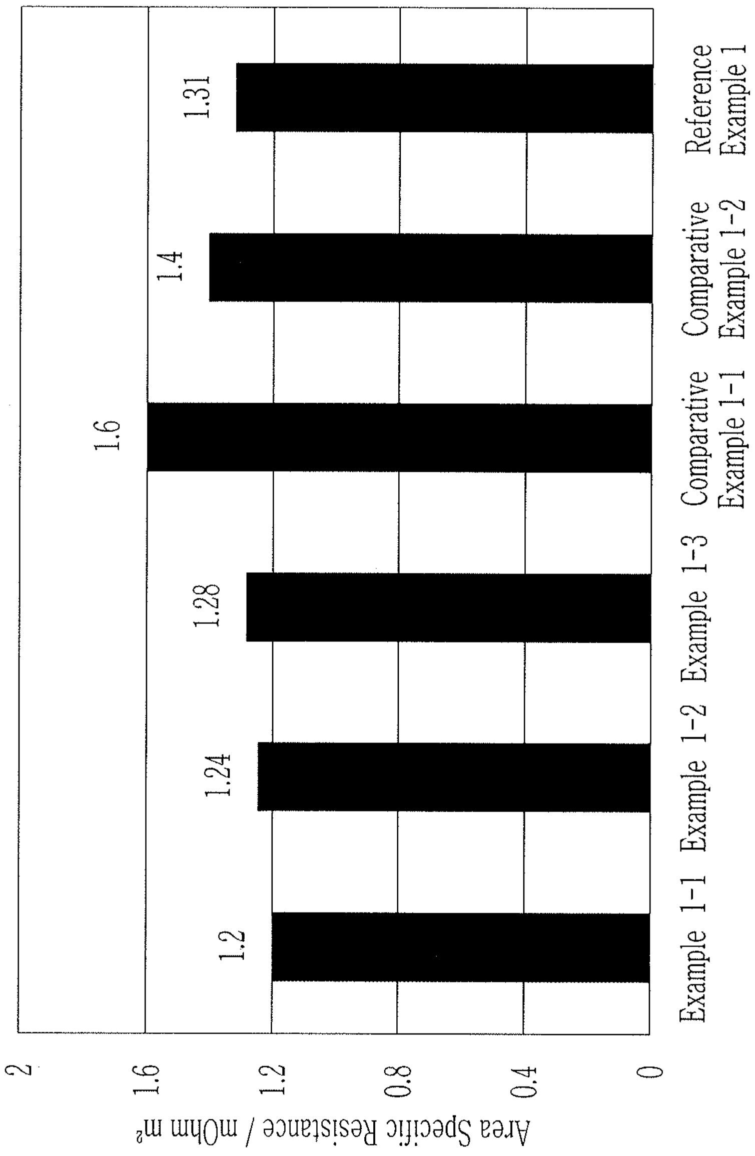
FIG. 6 illustrates a graph showing DC internal resistance (DC-IR) of rechargeable lithium battery cells according to Example 1-1, Example 1-2, Example 1-3, Comparative Example 1-1, Comparative Example 1-2, and Reference Example 1.

After measuring discharge capacity, the battery cells were constant current/constant voltage charged under a 0.7 C, 4.25 V, and 0.025 C cut-off condition and then, constant current discharged under a 0.1 C and 2.8 V cut-off condition. Herein, DC internal resistance (DC-IR) was calculated by measuring a voltage drop (V) generated when a current was made to flow at 1 C for 1 second under an SOC condition such as SOC70 (a state that a battery cell was charged to have charge capacity of 70% based on 100% of the entire charge capacity of the battery cell and in terms of a discharge state, the state that the battery cell was 30% discharged), SOC20 (a state that a battery cell was charged to have charge capacity of 20% based on 100% of the entire charge capacity of the battery cell and in terms of a discharge state, the state that the battery cell was 80% discharged), and SOC10 (a state that a battery cell was charged to have charge capacity of 10% based on 100% of the entire charge capacity of the battery cell and in terms of a discharge state, the state that the battery cell was 90% discharged). The results of Examples 1-1, 1-2, and 1-3, Comparative Examples 1-1 and 1-2, and Reference Example 1 are respectively shown in FIG. 6. As shown in FIG. 6, the rechargeable lithium battery cells of Examples 1-1, 1-2, and 1-3 having a DD value of 24 or greater and using a conductive agent having an average length of 1 μm or greater maintained DC internal resistance in a range of 1.2 (mΩ·m$^2$) to 1.3 (mΩ·m$^2$). On the contrary, that of Reference Example 1 having a DD value of 24 or greater and using a conductive agent having an average length of less than 1 μm had a DC internal resistance in a range of 1.3 (mΩ·m$^2$) to 1.35 (mΩ·m$^2$), that of Comparative Example 1-2 having a DD value of less than 24 and using a conductive agent having an average length of 1 μm or greater had a DC internal resistance of 1.4 or greater (mΩ·m$^2$), and that of Comparative Example 1-1 having a DD value of less than 24 and using a conductive agent having a length of less than 1 μm had a DC internal resistance of 1.6 or greater (mQ-m$^2$).

Evaluation of Cycle-Life Characteristics

Figure 7:
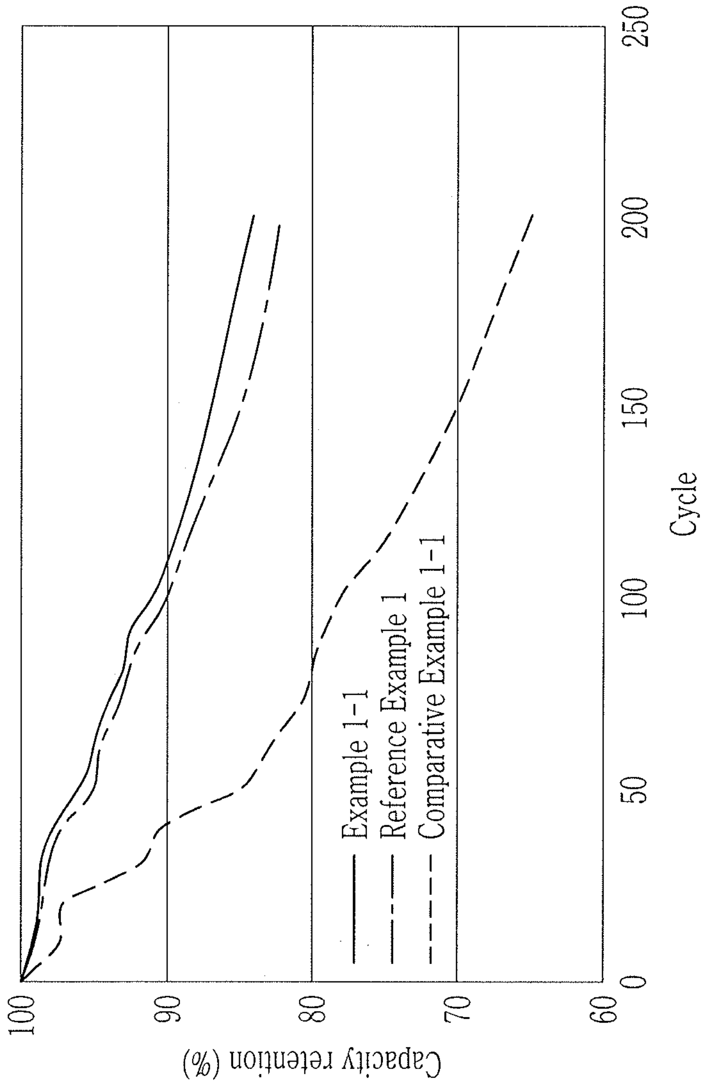
FIG. 7 illustrates a graph showing high-rate cycle-life maintenance rate of the rechargeable lithium battery cells manufactured according to Example 1-1, Comparative Example 1-1, and Reference Example 1.

The rechargeable lithium battery cells according to Examples, Comparative Examples, and Reference Examples were constant current/constant voltage charged under a 1.8 C, 4.25 V, and 0.025 C cut-off condition, paused for 10 μminutes, constant current discharged under a 1.0 C and 3.0 V cut-off condition, and paused again for 10 minutes, which is considered as one charge and discharge cycle, and herein, 200 charge and discharge cycles in total were performed. Subsequently, capacity retentions depending on these charge and discharge cycles were obtained by calculating a ratio of discharge capacity at each cycle relative to discharge capacity at the 1$^{st}$ cycle, and the results of Example 1-1, Comparative Example 1-1, and Reference Example 1 are shown in FIG. 7. As shown in FIG. 7, the rechargeable lithium battery cell of Example 1-1 having a DD value of 24 to 60 μmaintained a capacity retention of 84% or greater even at the 200$^{th}$ cycle, but the rechargeable lithium battery cell of Reference Example 1 having a DD value of 24 to 60 (the same as the DD value of Example 1-1) and using a conductive agent having an average length of less than 1 μm maintained a capacity retention of less than or equal to 82% at the $200^{th}$ cycle, and the rechargeable lithium battery cell of Comparative Example 1-1 having a DD value of less than 24 and using a conductive agent having an average length of less than 1 μm showed a sharply decreased capacity retention of less than 65% at the $200^{th}$ cycle.

By way of summation and review, negative active materials may include various carbon materials such as artificial graphite, natural graphite, hard carbon, and the like. Recently, a non-carbon negative active material such as silicon or tin has been considered in order to obtain high capacity.

One or more embodiments may provide a negative electrode for a rechargeable lithium battery having improved electrochemical characteristics.

A negative electrode for a rechargeable lithium battery according to an embodiment may provide a rechargeable lithium battery having improved battery characteristics.

DESCRIPTION OF SYMBOLS

1: rechargeable lithium battery
2: positive electrode
3: separator
4: negative electrode
5: battery case
6: sealing member Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A negative electrode for a battery, the negative electrode comprising:
a current collector; and
a negative active material layer on at least one surface of the current collector, the negative active material layer including a negative active material and a conductive agent,
wherein:
the negative active material includes a carbon negative active material and a Si-C composite negative active material,
the conductive agent includes a fiber-shaped conductive agent, and
a peak intensity ratio at a (002) plane relative to a (110) plane $I_{(002)}/I_{(110)}$ of about 40.7 to about 151.3 when XRD is measured by using a CuKα ray.

2. The negative electrode for a battery as claimed in claim 1, wherein the fiber-shaped conductive agent has a length of about 5 μm to about 50 μm.

3. The negative electrode for a battery as claimed in claim 1, wherein the conductive agent has a specific external surface area of about 4 $\mu m^2/g$ to about 1,500 $\mu m^2/g$.

4. The negative electrode for a battery as claimed in claim 1, wherein the conductive agent has an aspect ratio of about 10 to about 3,000.

5. The negative electrode for a battery as claimed in claim 1, wherein the fiber-shaped conductive agent includes a carbon nanotube, a vapor grown carbon fiber, a single-walled carbon nanotube, or a multi-walled carbon nanotube.

6. The negative electrode for a battery as claimed in claim 1, wherein the negative electrode has a single surface loading level (L/L) of about 6 $\mu mg/cm^2$ to about 65 $mg/cm^2$.

7. The negative electrode for a battery as claimed in claim 1, wherein the peak intensities are peak integral area values.

8. The negative electrode for a battery as claimed in claim 1, wherein the negative electrode has a peak intensity ratio at a (004) plane relative to a (002) plane of about 0.04 or greater when XRD is measured by using a CuKα ray.

9. The negative electrode for a battery as claimed in claim 1, wherein the negative electrode has a peak intensity ratio at a (004) plane relative to a (002) plane of about 0.04 to about 0.07 when XRD is measured by using a CuKα ray.

10. The negative electrode for a battery as claimed in claim 1, wherein the carbon negative active material is artificial graphite or a mixture of artificial graphite and natural graphite.

11. The negative electrode for a battery as claimed in claim 1, wherein the negative electrode has an active region facing a positive electrode and an inactive region not facing the positive electrode.

12. The negative electrode for a battery as claimed in claim 1, wherein the battery is an all-solid battery.

13. The negative electrode for a battery as claimed in claim 1, wherein the negative electrode is a dry electrode.

14. The negative electrode for a battery as claimed in claim 1, wherein the negative electrode has a peak intensity at a (002) plane $I_{(002)}$ of 48241.35 as measured by XRD using a CuKα ray under a condition of $2\theta=10°$ to 80°, a scan rate of (°/S)=0.06436, and a step size of 0.026°/step.

15. The negative electrode for a battery as claimed in claim 1, wherein the negative electrode has a peak intensity at a (110) plane $I_{(110)}$ of of 830.47 as measured by XRD using a CuKα ray under a condition of $2\theta=10°$ to 80°, a scan rate of (°/S)=0.06436, and a step size of 0.026°/step.

16. A battery, comprising:
the negative electrode as claimed in claim 1;
a positive electrode; and
an electrolyte.

* * * * *